United States Patent [19]

Thompson

[11] 4,061,200
[45] Dec. 6, 1977

[54] VEHICULAR ENERGY GENERATION SYSTEM

[76] Inventor: Joseph A. Thompson, 301 NE. 11th St., Oklahoma City, Okla. 73104

[21] Appl. No.: 648,390

[22] Filed: Jan. 12, 1976

[51] Int. Cl.² .......................................... B60K 25/08
[52] U.S. Cl. ............................ 180/66 B; 180/65 D; 180/66 R; 417/233
[58] Field of Search ................ 180/66 R, 66 B, 66 F, 180/65 D; 417/233, 231; 152/424, 425, 426

[56] References Cited

U.S. PATENT DOCUMENTS

| | | | |
|---|---|---|---|
| 573,580 | 12/1896 | Dyer | 417/233 |
| 852,301 | 4/1907 | Sharpneck | 180/66 F |
| 1,574,095 | 2/1926 | Jokisch | 180/65 D |
| 1,622,593 | 3/1927 | Landon | 417/233 |
| 2,319,718 | 5/1943 | Brooks | 417/233 |
| 2,675,761 | 4/1954 | Peterson | 180/66 R |
| 3,075,598 | 1/1963 | Pheneger | 180/66 R |
| 3,847,058 | 11/1974 | Manor | 60/370 |

FOREIGN PATENT DOCUMENTS 943,377  3/1949  France .............................. 152/425

*Primary Examiner*—Joseph F. Peters, Jr.
*Assistant Examiner*—David M. Mitchell
*Attorney, Agent, or Firm*—William R. Laney

[57] ABSTRACT

A vehicle energy generation system for use with a tubular vehicle tire which includes a pump assembly carried by the wheel rim upon which the tire is mounted and actuated by the periodic radial deflection of the tire as it rolls along the surface supporting the vehicle. A fluid motor assembly is disposed about the rotating axle carrying the wheel and inflatable tire mounted thereon. Conduits connect the pump assembly to the fluid motor assembly to direct pressurized fluid thereto from the pump assembly and return fluid therefrom to the pump assembly. Means are also disclosed for coupling the output of the fluid motor assembly to an electric generator.

8 Claims, 5 Drawing Figures

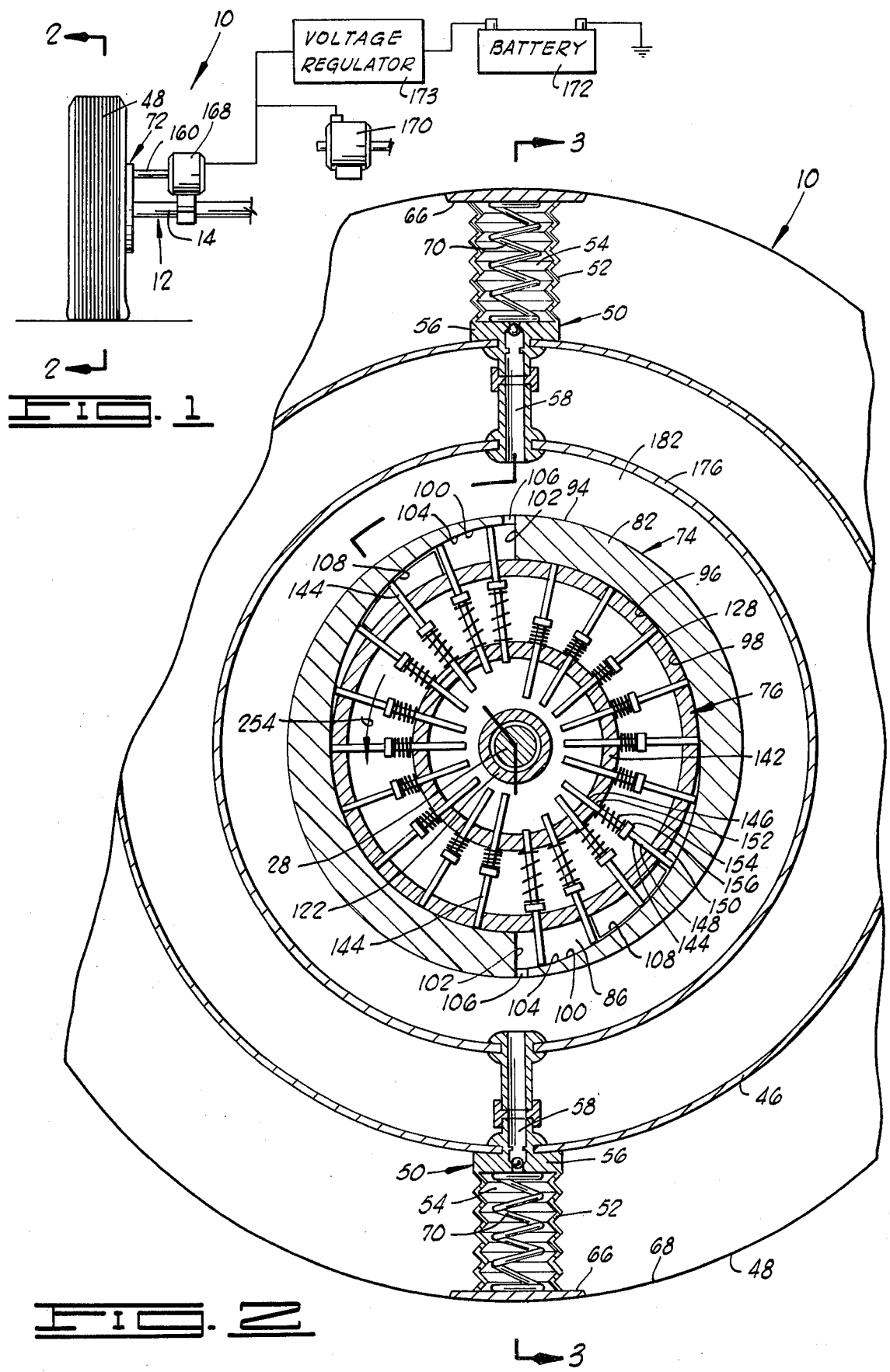

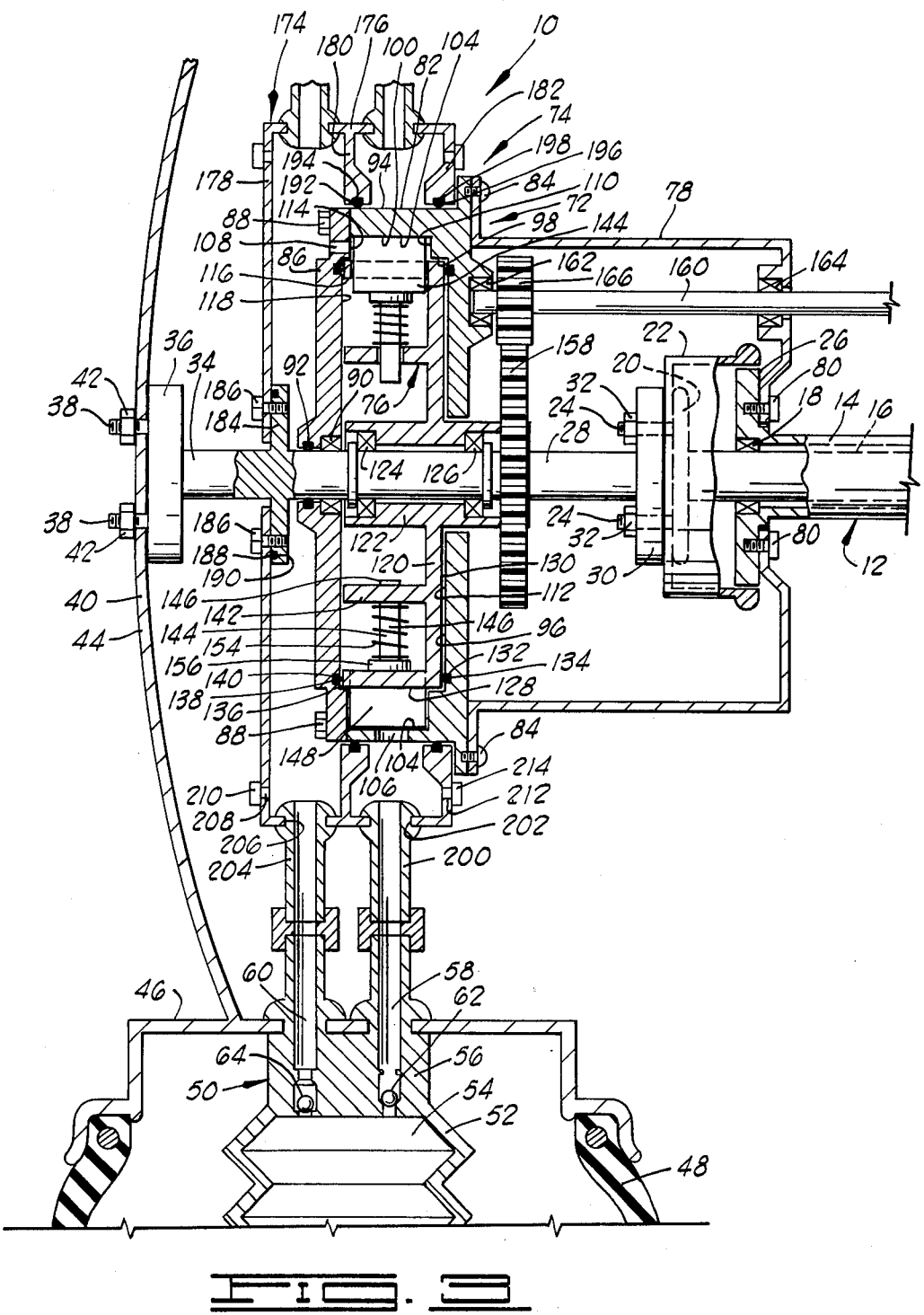

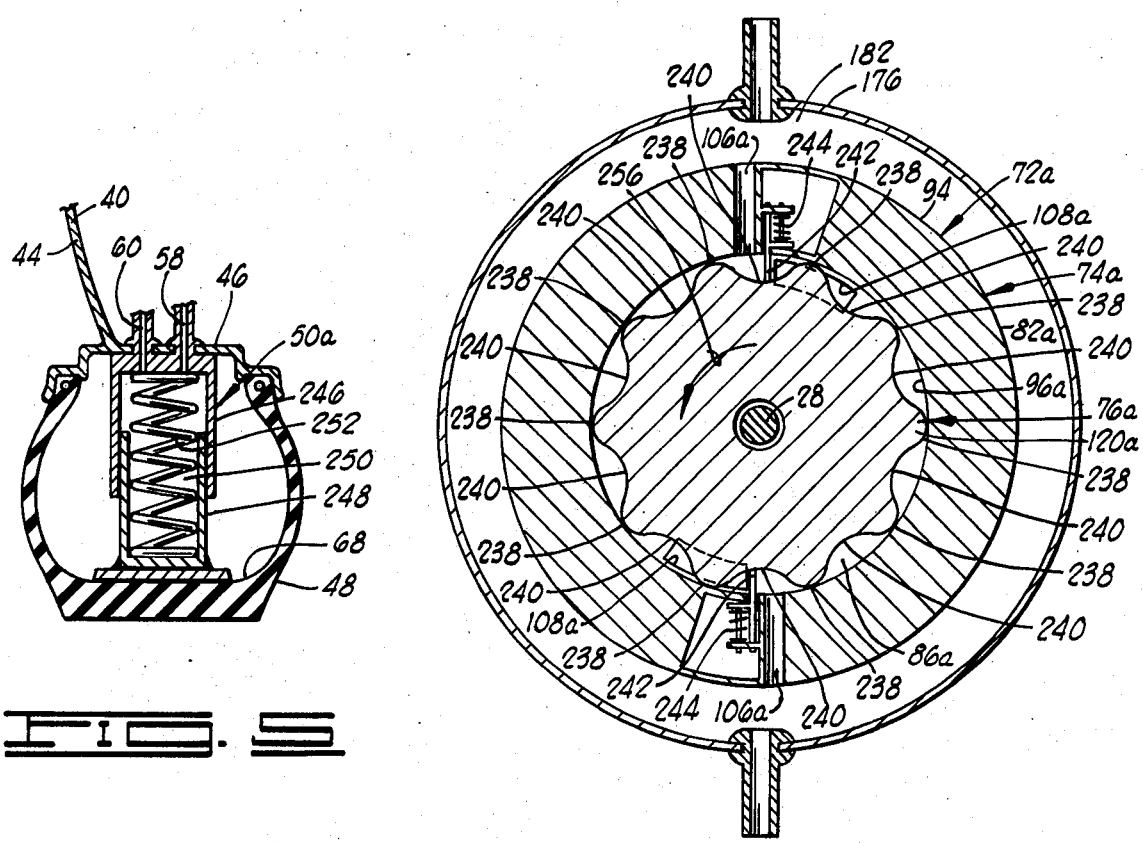

VEHICULAR ENERGY GENERATION SYSTEM

BACKGROUND OF THE INVENTION

1. Field of the Invention

This invention relates generally to improvements in vehicular energy generation systems and, more particularly, but not by way of limitation, to a vehicular energy generation system which harnesses otherwise wasted vehicle driving energy to perform useful work.

2. Description of the Prior Art

The prior art contains a number of teachings of apparatus responsive to the rotation or vertical reciprocation of vehicular support wheels to provide energy to perform additional work on the vehicle. However no system is presently known which provides means for harnessing previously wasted energy consumed in the radial deflection of the tubular inflatable tires of vehicles as they move along the ground surface.

SUMMARY OF THE INVENTION

The present invention contemplates an energy generation system for use with a vehicle or the like having an axle and being supportable on a supporting surface. The system includes resilient tire means rotatably mounted on the axle for supporting at least a portion of the weight of the vehicle on the support surface, the tire means being compressible in response to the weight of the vehicle supported thereby. A fluid motor is secured to the vehicle in non-rotating relation. An output shaft is journaled in the fluid motor. The system further includes pump means operatively engageable with the power means for pumping fluid in response to the compression of the tire means when the tire means rolls over the support surface. A first conduit communicates between a fluid outlet in the pump means and a fluid inlet in the fluid motor means and a second conduit communicates between a fluid outlet in the fluid motor means and a fluid inlet in the pump means.

An object of the invention is to provide a vehicular energy generation system which may be readily adaptable to conventional existing vehicles.

A further object of the invention is to provide a vehicle energy generation system which is economical in construction and reliable in operation.

Other objects and advantages of the invention will be evident from the following detailed description when read in conjunction with the accompanying drawings.

BRIEF DESCRIPTION OF THE DRAWINGS

FIG. 1 is an elevation view of the vehicular energy generation system of the present invention installed on the axle assembly of a vehicle and showing in schematic form the electrical circuitry thereof.

FIG. 2 is a cross-sectional view taken along line 2—2 of FIG. 1.

FIG. 3 is a cross-sectional view taken along line 3—3 of FIG. 2.

FIG. 4 is a cross-sectional view similar to FIG. 2 illustrating an alternate form of fluid motor assembly.

FIG. 5 is a cross-sectional view illustrating an alternate form of pump assembly for use with the present invention.

DESCRIPTION OF THE PREFERRED EMBODIMENT

Referring now to the drawings, and FIGS. 1-3 in particular, there is illustrated therein a vehicular energy or power generation system which is generally designated by the reference character 10. The system 10 is shown mounted on the axle assembly 12 of a suitable vehicle such as an automobile. The details of construction of such a vehicle are not illustrated in the drawings since such structure is not considered essential for a complete understanding of the present invention.

The axle assembly 12 includes an axle carrier 14 which is mounted on the vehicle in the usual manner in non-rotating relation thereto. The axle carrier 14 carries an axle shaft 16 which is journaled in the axle carrier 14 on suitable bearings, as shown at 18, for rotation therein. The axle shaft 16 includes a flange 20 on the outer end thereof to which a brake drum 22 is ordinarily secured. Wheel mounting studs 24 extend from the flange 20 to provide conventional means for securing a wheel to the axle shaft 16. A flange 26 is formed on the outer end portion of the axle carrier 14.

The energy generation system 10 includes an axle extension 28 having a flange 30 formed on one end thereof which is secured to the flange 20 of the axle shaft 16 by means of threaded nuts 32 secured to the wheel mounting studs 24. The opposite end portion 34 of the axle extension 28 carries a wheel mounting flange 36 thereon having wheel mounting studs 38 extending therefrom to provide means for securing a wheel 40 thereto by means of threaded nuts 42 threadedly engaged with the studs 38.

The wheel 40 comprises a hub portion 44 secured to the flange 36, and a tire-mounting rim portion 46 secured to the hub portion 44. A conventional tubeless tire 48 is mounted on the rim portion 46 and is inflated with air or another suitable gas to provide rolling support for that portion of the weight of the vehicle bearing on the axle assembly, and the wheel of the energy generation system 10.

The energy generation system 10 further includes one or more pump assemblies 50 mounted on the rim portion 46 of the wheel 40 and disposed within the tire 48. The pump assembly 50 preferably includes a resilient closed bellows structure 52 having a compressible chamber 54 therein and sealingly mounted at one end 56 thereof in the rim portion 46 of the wheel 40. A fluid outlet 58 and a fluid inlet 60 are formed in the one end 56 and provide passages from the compressible chamber 54 through the rim portion 46. A one-way check valve 62 is positioned in the fluid outlet 58 and allows fluid flow from the compressible chamber 54 outwardly through the fluid outlet 58 while preventing fluid flow in the opposite direction. Similarly, a one-way check valve 64 is positioned in the fluid inlet 60 and allows fluid flow through the fluid inlet 60 into the compressible chamber 54 while preventing fluid flow in the reverse direction. The inherent resilience of the bellows structure 52 tends to maintain the bellows 52 in an extended position with the outer end portion 66 thereof in constant contact with the inner wall 68 of the tire 48. It will be understood that the bellows structure 52 may also include a compression coil spring 70 to maintain the outer end portion 66 in contact with the inner wall 68 of the tire 48 either alone or as a supplement to the inherent resilience of the bellows structure 52. It will be understood that, although only two pump assemblies 50 are illustrated in the energy generation system, additional pump assemblies 50 may be mounted on the rim portion 46 of the wheel 40 to provide increased pumping capacity.

The energy generation system 10 further includes a fluid motor assembly 72 comprising a fluid motor housing assembly 74 and a fluid motor rotor assembly 76. The fluid motor housing assembly 74 includes a power transmission housing 78 secured by suitable means such as bolts 80 to the flange 26 of the axle carrier 14 whereby the power transmission housing 78 is maintained in non-rotating relation to the vehicle. The fluid motor housing assembly 72 further includes a rotor housing 82 which is fixedly secured to the power transmission housing 78 by suitable means such as bolts 84. A rotor housing cover plate 86 is fixedly secured to the rotor housing 82 by suitable means such as bolts 88 and may be supported by a suitable bearing 90 positioned between the rotor housing cover plate 86 and the axle extension 28. The bearing 90 provides additional support for the fluid motor housing assembly 74 at the end thereof adjacent the wheel 40. An annular seal 92 is carried by the rotor housing cover plate 86 and provides a fluid-tight seal between the cover plate 86 and the outer surface of the axle extension 28.

The rotor housing 82 has a cylindrically shaped outer peripheral surface 94 formed thereon and a rotor cavity 96 formed therein. The rotor cavity 96 includes a substantially cylindrically shaped inner surface 98 which is interrupted by a pair of non-circular portions 100. The non-circular portions 100 each include a substantially radially aligned wall 102 which communicates with the inner surface 98 and a smoothly curved surface 104 extending from the wall 102 which tangentially intersects the inner surface 98. A fluid inlet port 106 is formed in the rotor housing 82 adjacent each wall 102 and communicates between the outer surface 94 and the surface 104 of the respective non-circular portion 100. A fluid outlet port 108 is formed in the rotor housing cover plate 86 adjacent each non-circular portion 100 of the rotor housing 82.

As shown in FIG. 3, the rotor housing 82 further includes a side wall or surface 110 in each non-circular portion 100 which communicates between the surface 104 and the surface 98. A radial wall 112 extends inwardly from the inner surface 98.

The rotor housing cover plate 86 includes a first inner surface 114 which communicates with the surface 104 of each non-circular portion 100. The rotor housing cover plate 86 also includes a cylindrical surface 116 which communicates with the first inner surface 114 and further communicates with a radial wall 118 which extends radially inwardly therefrom toward the bearing 90.

The fluid motor rotor assembly 76 is disposed within the rotor cavity 96 of the rotor housing 82. The fluid motor rotor assembly 76 includes a rotor member 120 having a rotor hub 122 journaled on the axle extension 28 by means of suitable bearings 124 and 126. The rotor member 120 includes a cylindrically shaped outer surface 128 closely received within the inner surface 98 of the rotor cavity 96. A radial wall 130 extends radially inwardly from the outer surface 128 to the hub 122. A sliding annular seal member 132 is carried in an annular groove 134 in the rotor housing 82 and provides a sliding fluid-tight seal between the radial wall 130 of the rotor member 120 and the radial wall 112 of the rotor housing 82. A second radial wall 136 is formed on the rotor member 120 and extends radially inwardly from the outer surface 128. An annular sliding seal member 138 is carried in an annular groove 140 in the radial wall 118 of the rotor housing cover plate 86 and provides a sliding fluid-tight seal between the radial wall 118 of the cover plate 86 and the radial wall 136 of the rotor hub member 120.

An annular wall structure 142 is formed on the rotor member 120 intermediate the hub 122 and the outer surface 128. A plurality of sliding vanes 144 are radially slidably mounted in the rotor member 120. Each sliding vane includes a shank portion 146 and a blade portion 148. The blade portion 148 of each sliding vane 144 is slidably received in the rotor member 120 in a corresponding slot 150 formed in the rotor member adjacent the outer surface 128. The shank portion 146 of each sliding vane is slidably received in a corresponding aperture 152 formed in the annular wall structure 142. The blade portion 148 is sized and shaped to slidably engage the surface 104 of each non-circular portion 100 as well as the side wall 110 of the rotor housing 82 and the first inner surface 114 of the rotor housing cover plate 86 as well as the inner surface 98 of the rotor cavity 96. Each sliding vane 144 is biased radially outwardly into engagement with the rotor cavity 96 by means of a compression coil spring 154 acting between the annular wall structure 142 and a flange 156 formed on the shank portion 146.

A drive gear 158 is drivingly secured to the rotor hub 122 and is disposed within the power transmission housing 78. An output shaft 160 is journaled in the power transmission housing 78 by means of suitable bearings 162 and 164. A driven gear 166 is fixedly secured to the output shaft 160 and is meshingly engaged with the driving gear 158 whereby rotation of the fluid motor rotor assembly 76 causes a resulting rotation of the output shaft 160. The output shaft 160 may be connected to a suitable electric generator or alternator 168 mounted on the axle carrier 114, which generator in turn provides electric current to the vehicle to drive an electric motor 170 or charge a storage battery 172 via a voltage regulator 173.

A fluid chamber assembly 174 is mounted on the axle extension 28 and rotates therewith about the fluid motor assembly 72. The fluid chamber assembly 174 comprises a cylindrically shaped outer wall 176 having first, second and third inwardly extending radial walls 178, 180 and 182 communicating therewith. The radial wall 178 is fixedly secured to a flange 184 formed on the axle extension 28 by a suitable means such as bolts 186. A fluid-tight seal is achieved between the radial wall 178 and the flange 184 by means of an annular seal member 188 disposed therebetween and carried in an annular groove 190 formed on the flange 184. This interconnection between the radial wall 178 and the flange 184 provides support for the fluid chamber assembly 174 on the axle extension 28. An annular seal member 192 is carried in an annular groove 194 along the inner edge of the second radial wall 180 and provides a sliding fluid-tight seal between the radial wall 180 and the outer peripheral surface 94 of the rotor housing 82. An annular seal member 196 is carried in an annular groove 198 in the inner edge of the third inwardly extending radial wall 182 and provides a sliding fluid-tight seal between the radial wall 182 and the outer peripheral surface 94 of the rotor housing 82.

The outer wall 176 and the second and third radial walls 180 and 182 define an annular fluid inlet chamber which communicates with the fluid inlet ports 106 of the rotor housing 82. The outer wall 176 and the first and second radial walls 178 and 180 define an annular fluid outlet chamber which communicates with the fluid outlet ports 108 in the rotor housing cover plate 86 of the fluid motor housing assembly 74. A conduit 200 communicates between the fluid outlet 58 of each pump assembly 50 and a corresponding port 202 formed in the outer wall 176 and communicating with the annular fluid inlet chamber. Similarly, a conduit 204 communicates between the fluid inlet 60 of each pump assembly 50 and a corresponding port 206 formed in the outer wall 176 communicating with the annular fluid outlet chamber of the fluid chamber assembly 174. One or more access ports 208 are formed in the first radial wall 178 to provide means for introducing fluid into the annular fluid outlet chamber of the fluid chamber assembly 174. The access ports 208 are closed by suitable threaded plugs 210. Similarly, one or more access ports 212 are formed in the third radial wall 182 to provide means for introducing fluid into the annular fluid inlet chamber of the fluid chamber assembly 174 and are preferably closed by threaded plugs 214.

FIG. 4 illustrates a modified form of the fluid motor assembly which will be designated by the reference character 72a. The fluid motor assembly 72a includes a modified fluid motor housing assembly 74a and a modified fluid motor rotor assembly 76a.

The fluid motor housing assembly 74a includes a modified rotor housing 82a which is fixedly secured to the previously described power transmission housing 78 by suitable means such as bolts 84. A modified rotor housing cover plate means 86a is fixedly secured to the rotor housing 82a by suitable means such as bolts 88 and may be additionally supported by a suitable bearing 90 positioned between the rotor housing cover plate 86a and the axle extension 28.

The rotor housing 82a has a cylindrically shaped outer peripheral surface 94 formed thereon and a cylindrically shaped rotor cavity 96a formed therein. A pair of fluid inlet ports 106a are formed in the rotor housing 82a and communicate between the peripheral surface 94 and the rotor cavity 96a. A pair of fluid outlet ports 108a are formed in the rotor housing cover plate 86a each adjacent a respective fluid inlet port 106a.

The modified fluid motor rotor assembly 76a is disposed and journaled within the rotor cavity 96a of the rotor housing 82a in the manner substantially as described above for the fluid motor rotor assembly 76 and the rotor housing 82. The fluid motor rotor assembly 76a includes a modified rotor member 120a which includes a plurality of radially outwardly extending lobes 238 which slidingly engage the substantially cylindrically shaped inner surface 98a of the rotor cavity 96a. Each lobe 238 is connected to the next adjacent lobe 238 by a smooth concave surface 240.

The rotor housing 82a further includes a radially inwardly extending sliding vane 242, slidably mounted therein for radial movement relative thereto, intermediate each fluid inlet port 106a and the adjacent fluid outlet port 108a of the rotor housing cover plate 86a. Each sliding vane 142 is biased radially inwardly by suitable means such as a compression coil spring 244.

It will be readily apparent that although only two fluid inlet ports 106a and two sliding vanes 242 are illustrated in the modified fluid motor assembly 72a, additional ports and vanes may be added to the fluid motor housing assembly 74a as may be desired. Similarly, additional fluid outlet ports 108a may be added to the modified rotor housing cover plate 86a as may be desired to operate in conjunction with the sliding vanes 242.

FIG. 5 illustrates a slightly modified pump assembly 50a comprising a cylinder portion 246 mounted in the wheel rim 46 and a piston portion 248 slidably and sealingly received therein and engaging the inner wall 68 of the tire 48. The cylindrical portion 246 and piston portion 248 provide a cavity 250 therein which communicates with the fluid outlet 58 and fluid inlet 60. A compression coil spring 252 is disposed within the cavity 250 to maintain the piston portion 248 in contact with the inner wall 68 of the tire 48.

OPERATION

The vehicular energy generation system 10 operates in the following manner. A suitable fluid, such as a conventional hydraulic fluid, is disposed within the pump assembly 50, the fluid motor assembly 72, the fluid chamber assembly 174 and the conduits 200 and 204. As the vehicle rolls along the support surface, it will be understood that that portion of the tire 48 n contact with the support surface will be radially deflected or compressed a certain distance in response to the weight of the vehicle supported thereby. As the tire 48 is compressed at a point adjacent to one of the pump assemblies 50, the pump assembly is compressed thereby forcing fluid therefrom through the respective fluid outlet 58 and conduit 200 into the annular fluid inlet chamber of the fluid chamber assembly 174. Upon repeated compressions of the pump assemblies 50, the hydraulic pressure which is increasing in the fluid chamber assembly 174 is directed through the fluid inlet port 106 of the fluid motor assembly 72 and is successively applied to the sliding vanes 144 of the fluid motor rotor assembly 76 whereby the rotor assembly 76 is rotated in the direction indicated by the arrow 254 as shown in FIG. 2. As each successive sliding vane 144 passes a fluid outlet port 108, the hydraulic fluid acting thereon is directed outwardly through the fluid outlet port 108 to the annular fluid outlet chamber of the fluid chamber assembly 174 from which the lower pressure fluid is returned to the pump assemblies 50 through the repeated pumping action thereof. The rotation of the fluid motor rotor assembly 76 is coupled through the previously described gears and shafts to drive an electric motor.

In a similar manner, the modified fluid motor assembly 72a is driven by directing the pressurized fluid into the rotor cavity 96a through the fluid inlet ports 106a. The pressurized fluid is applied successively to the lobes 238 adjacent to the respective fluid inlet port 106a to rotate the fluid motor rotor assembly 76a in the direction indicated by the arrow 256 as shown in FIG. 6. When the fluid disposed between the adjacent lobes 238 and the cavity 96a communicates with a fluid outlet port 108a, the fluid is forced therethrough by the rotation of the rotor into the annular fluid outlet chamber of the fluid chamber assembly 174 where the fluid may then be drawn again into the pump assemblies 50 through the operation thereof for recirculation through the system.

It will be understood that, with minor structural detail modifications to the energy generation system 10, the system may be advantageously operated using a gaseous fluid rather than a fluid in the liquid state.

It will be seen from the foregoing description, that the present invention provides a vehicle energy generation system which provides means for harnessing and utilizing energy which is developed by the radial deflection of a conventional inflatable tubular tire used to provide motive support for a vehicle.

Changes may be made in the combination and arrangement of parts or elements as heretofore set forth in the specification and shown in the drawings without departing from the spirit and scope of the invention as defined in the following claims.

What is claimed is:

1. An energy generation system for use with a vehicle or the like having an axle and supportable on a supporting surface, comprising:
   resilient tire means mounted on said axle for supporting at least a portion of the weight of said vehicle on the support surface, said tire means being compressible in response to the weight of the vehicle supported thereby;
   a fluid motor secured to said vehicle and having a fluid inlet and a fluid outlet and a fluid motor rotor journaled for rotation about the axis of rotation of said axle;
   output shaft means journaled in said fluid motor and drivingly connected to said fluid motor rotor for rotation by said fluid motor rotor;
   pump means having a fluid inlet and a fluid outlet and operatively engageable with said tire means for pumping fluid in response to the compression of said tire means when said tire means rolls over the support surface;
   first conduit means communicating between the fluid outlet in said pump means and the fluid inlet in said fluid motor;
   second conduit means communicating between the fluid outlet in said fluid motor and the fluid inlet in said pump means; and
   wherein said resilient tire means is characterized further to include:
   wheel means mounted on said axle for rotating about the axis thereof; and
   a tubular, inflatable tire mounted on said wheel means; and
   wherein said pump means is characterized further to include:
   at least one radially compressible chamber mounted on said wheel means and disposed within said tubular tire and engageable therewith, and with the interior of said compressible chamber communicating with the fluid outlet and the fluid inlet of said pump means.

2. An energy generation system for use with a vehicle having a non-rotating structure and an axle rotatable with respect to said non-rotating structure, comprising:
   wheel means mounted on said axle for rotating therewith;
   resilient tire means mounted on said wheel means for supporting at least a portion of the weight of said vehicle on a support surface, said tire means being compressible in response to the weight of the vehicle supported thereby;
   pump means having a fluid outlet and a fluid inlet and mounted on said wheel means and operatively engageable with said tire means for pumping fluid in response to the compression of said tire means as it rolls over the support surface;
   a fluid motor housing fixedly secured to the non-rotating structure of said vehicle and having a fluid inlet and a fluid outlet;
   fluid motor rotor means journaled for rotation about the axis of rotation of the rotatable axle of said vehicle within said fluid motor housing in response to the application of pumped fluid thereto;
   fluid inlet chamber means communicating between the fluid outlet of said pump means and said fluid motor rotor means via the fluid inlet of said fluid motor housing;
   fluid outlet chamber means communicating between the fluid outlet of said fluid motor housing and the fluid inlet of said pump means;
   a quantity of fluid disposed within said pump means, said fluid inlet chamber means, said fluid motor housing and said fluid outlet chamber means;
   non-motive power means carried by said vehicle for utilizing the kinetic energy of said rotating fluid motor rotor means to provide auxiliary, non-motive power to said vehicle; and
   energy transmission means operatively interconnecting said fluid motor rotor means and said non-motive power means for transmitting kinetic energy from said rotating fluid motor rotor means to said non-motive power means to facilitate the provision of auxiliary, non-motive power to said vehicle by said non-motive power means.

3. The energy generation system as defined in claim 2 wherein said fluid motor housing is characterized further to include:
   a cavity formed therein and having a substantially circular inner surface and at least one portion having a non-circular inner surface and communicating with the fluid inlet and the fluid outlet of said fluid motor housing; and
   wherein said fluid motor rotor means is characterized further to include:
   a rotor having a circular outer surface and journaled on said axle within said cavity of said fluid motor housing;
   a plurality of outwardly extending sliding vanes slidably mounted in said rotor for movement relative thereto; and
   biasing means operatively engageable with said sliding vanes for biasing said sliding vanes radially outwardly into engagement with the inner surfaces of said cavity of said rotor housing.

4. The energy generation system as defined in claim 2 wherein said fluid motor housing is characterized further to include:
   a cavity formed therein having a circular inner surface and communicating with the fluid inlet and the fluid outlet of said fluid motor housing;
   an inwardly extending sliding vane slidably mounted in said fluid motor housing for movement relative to and adjacent the fluid inlet of said fluid motor housing; and
   biasing means operatively engageable with said sliding vane for biasing said sliding vane inwardly;
   wherein said fluid motor rotor means is characterized further to include:
   a rotor journaled on said axle within said cavity and having a plurality of outwardly extending lobes formed on the periphery thereof and slidably engageable with the inner surfaces of said cavity and the periphery being slidably engageable with said sliding vane.

5. The energy generation system as defined in claim 2 wherein said energy transmission means is characterized further to include:
   output shaft means journaled on said vehicle for rotation relative to said fluid motor housing; and means drivingly interconnecting said fluid motor rotor means and said output shaft means for transmitting the rotation of said fluid motor rotor means to said output shaft means.

6. The energy generation system as defined in claim 5 wherein said means drivingly interconnecting said fluid motor rotor means and said output shaft means is characterized further to include:
- a driving gear fixedly secured to said fluid motor rotor means; and
- a driven gear fixedly secured to said output shaft means and meshingly engaged with said driving gear.

7. The energy generation system as defined in claim 2 wherein said resilient tire means is characterized further to include:
- a tubular, inflatable tire; and wherein said pump means is characterized further to include:
- at least one radially compressible chamber mounted on said wheel means and disposed within said tubular tire and engageable therewith, and with the interior of said compressible chamber communicating with the fluid outlet and the fluid inlet of said pump means, whereby radial compression of said tubular tire radially compresses said radially compressible chamber to pump fluid therefrom through the fluid outlet of said pump means.

8. The energy generation system as defined in claim 7 wherein said at least one radially compressible chamber is characterized further to include:
- first one-way check valve means communicating with the fluid outlet of said pump means for passing fluid outwardly therethrough from the interior of said compressible chamber; and
- second one-way check valve means communicating with the fluid inlet of said pump means for passing fluid therethrough into the interior of said compressible chamber.

* * * * *